United States Patent [19]

Matsumoto et al.

[11] Patent Number: 4,973,567
[45] Date of Patent: Nov. 27, 1990

[54] ELECTRIC CERAMIC COMPOSITION

[75] Inventors: Kazutoshi Matsumoto, Matsudo; Takehiro Hyuga, Ichikawa; Tetsuya Mukai, Matsudo, all of Japan

[73] Assignee: Sumitomo Metal Mining Company Limited, Tokyo, Japan

[21] Appl. No.: 437,582

[22] Filed: Nov. 17, 1989

[30] Foreign Application Priority Data

Dec. 22, 1988 [JP] Japan ................. 63-324425

[51] Int. Cl.$^5$ ............................................. C04B 35/00
[52] U.S. Cl. ................................................... 501/135
[58] Field of Search ......................................... 501/135

[56] References Cited

U.S. PATENT DOCUMENTS 4,485,180 11/1984 Konoike et al. .................. 501/135
4,717,694 1/1988 Tamura et al. ..................... 501/135

FOREIGN PATENT DOCUMENTS 3331610 3/1984 Fed. Rep. of Germany ...... 501/135
59-23044 5/1984 Japan .
59-48484 11/1984 Japan .
60-216407 10/1985 Japan .
61-8804 1/1986 Japan .
1142602 6/1986 Japan ................................... 501/135

OTHER PUBLICATIONS

End et al., *Dialectric Properties of Ceramics in Ba(-CO$_{\frac{1}{3}}$Nb$_{\frac{2}{3}}$)O$_3$Ba(Zn$_{\frac{1}{3}}$Nb$_{\frac{2}{3}}$)O$_3$ Solid Solutions*, J. Am. Ceramic Soc., 1987.

*Primary Examiner*—Ferris H. Lander
*Assistant Examiner*—Deborah Jones
*Attorney, Agent, or Firm*—Watson, Cole, Grindle & Watson

[57] ABSTRACT

A dielectric ceramic composition possessing a high dielectric constant and a high unloaded Q and exhibiting stable electric properties even in the high frequency range of 10 GHz contains BaO, ZnO, MgO, NiO, ZrO$_2$ and Ta$_2$O$_5$ in amounts of not less than 59.0 mol % and not more than 66.0 mol % of BaO, less than 10 mol % of ZnO, less than 10 mol % of MgO, less than 10 mol % of NiO, less than 10 mol % of ZrO$_2$, and not less than 19.0 mol % and less than 24 mol % of Ta$_2$O$_5$.

8 Claims, No Drawings

ELECTRIC CERAMIC COMPOSITION

BACKGROUND OF THE INVENTION

1. Field of the Invention

This invention relates to a dielectric ceramic composition which possesses a high dielectric constant and a high unloaded Q and exhibits stable temperature properties.

2. Description of the Prior Art

In dielectric resonators and dielectric substrates used in signal circuits operating in the high frequency region, such as the microwave and millimeter wave regions, dielectric ceramics possessing a high dielectric constant and a high unloaded Q and exhibiting stable temperature properties find utility.

Heretofore, as dielectric ceramics of this kind, dielectric ceramics of the Ba(Zn-Ta)O type [Japanese Patent Publication SHO 59(1984)-48,484], the Ba(Zn-Nb)O type [Japanese Patent Publication SHO 59(1984)-48,483], the Ba(Zn-Ta-Nb)O type [Japanese Patent Publication SHO 59(1984)-23,044], the Ba(Mg-Ni-Ta)O type [Japanese Patent Application Disclosure SHO 60(1985)-216,407], and the Ba(Mg-Co-Ta)O type [Japanese Patent Application Disclosure SHO 61(1986)-8,804] have been proposed.

The dielectric ceramics of the compositions disclosed in the three Japanese Patent Publications mentioned above have a high dielectric constant on the order of 30 to 40 and yet offer a small unloaded Q of about 5,000 in the high frequency region of about 10 GHz. The dielectric ceramics of the compositions disclosed in the two Japanese patent application disclosures mentioned above indeed have a large unloaded Q of about 8,000 and yet offer a low dielectric constant on the order of 25. Thus, they have a problem that they do not fulfill the requirement for a higher unloaded Q and a larger dielectric constant which the dielectric ceramic articles used in communication devices are expected to possess in keeping pace with the gradual advance in performance of such communication devices in recent years.

SUMMARY OF THE INVENTION

It is, therefore, an object of this invention to provide a dielectric ceramic composition which is free from the problem mentioned above and possesses a high unloaded Q and a large dielectric constant and exhibit stable temperature properties even in the high frequency region of 10 GHz.

DESCRIPTION OF PREFERRED EMBODIMENT

The inventors continued a diligent study for the purpose of solving the problem mentioned above and accomplishing the object mentioned above. They have consequently found that the object is fulfilled by an oxide composition containing Ba, Zn, Mg, Ni, Zr, and Ta in specified proportions. The present invention has been completed as the result. To be specific, this invention is directed to a dielectric ceramic composition containing not less than 59.0 mol % and not more than 66.0 mol % of BaO, less than 10 mol % of ZnO, less than 10 mol % of MgO, less than 10 mol % of NiO, less than 10 mol % of $ZrO_2$, and not less than 19.0 mol % and less than 24 mol % of $Ta_2O_5$.

For the components of the composition of this invention, the corresponding oxide powders to be used are desired each to have a purity of about 99.9% by weight. The unloaded Q is lowered if the proportion of BaO is less than 59.0 mol % or more than 66.0 mol %. The unloaded Q is similarly lowered if the proportion of ZnO exceeds 10 mol %. The dielectric constant is lowered or the unloaded Q is lowered if the ZnO content is absent. The dielectric constant is lowered if the proportion of MgO exceeds 10 mol %. The unloaded Q is low if the MgO content is absent. The unloaded Q is lowered if the proportion of NiO exceeds 10 mol %. The temperature coefficient of resonant frequency is unduly large on the positive side if the NiO content is absent. The temperature coefficient unduly increases if the proportion of $ZrO_2$ exceeds 10 mol %. The dielectric constant is lowered if the $ZrO_2$ content is absent. The unloaded Q is lowered if the proportion of $Ta_2O_5$ deviates from the range of not less than 19 mol % and less than 24 mol %. Hence, the aforementioned ranges for the component oxides mentioned above.

The raw material powder prepared by combining the component oxides in the ratio described above is mixed with pure water in a pot made of resin with the aid of resin-coated balls for a period of 10 to 20 hours. The resultant mixture is dried at a temperature in the range of 100° to 150° C. for a period in the range of one to three hours. The dried mixture is then calcined in an atmosphere of oxygen or in the air at a temperature in the range of 1,000° to 1,300° C. for a period in the range of one to five hours. The product of calcination is pulverized into particles 40 to 100 mesh in diameter. The resultant powder is molded in a prescribed shape in a hydrostatic pressure under a pressure of 1 to 2 $t/cm^2$. The product aimed at is obtained by firing the molded pass in an atmosphere of oxygen or in the air at a temperature in the range of 1,450° to 1,650° C. for a period in the range of two to ten hours.

Now, the present invention will be described more specifically below with reference to working examples.

EXAMPLES 1 TO 9

As raw materials, powders of barium carbonate, zinc oxide, magnesium oxide, nickel oxide, zirconium oxide, and tantalum oxide each of a purity of 99.9% by weight were weighed out in amounts calculated to permit production of dielectric ceramic particles of compositions shown in Table 1. Each of the raw materials so weighed out was placed in conjunction with pure water in a pot made of resin and mixed therein with the aid of resin-coated balls for a period of 16 hours. The resultant mixture was dried at 150° C. for three hours and then calcined in an atmosphere of oxygen at a temperature in the range of 1,000° to 1,200° C. for two hours. The product of this calcination was pulverized and then passed through a 42-mesh sieve for unification of particle diameter. In a metallic die, the resultant powder was subjected to primary molding in the shape of a disk 10 mm in diameter and 5 mm in thickness under a pressure of 500 $kg/cm^2$ and then press molded in a prescribed shape in a hydrostatic press under a pressure of 2,000 $kg/cm^2$. The shaped mass thus obtained was fired in an atmosphere of oxygen at a temperature in the range of 1,500° to 1,650° C. for a period of four hours, to obtain a dielectric ceramic article.

The dielectric ceramic article was tested for dielectric constnat ($\epsilon r$), unloaded Q ($Q_o$), and temperature coefficient ($\tau f$) of resonant frequency by the dielectric rod resonator methode using a frequency of about 10 GHz.

The results were as shown in Table 1.

COMPARATIVE EXPERIMENTS 1 TO 10

Dielectric ceramic articles of compositions shown in Table 1 were produced by following the procedure of Example 1 and they were tested for the same properties as mentioned above in the same manner as in Example 1. The results were as shown in Table 1.

TABLE 1

| | Composition (mol %) | | | | | | Dielectric constant | unloaded Q | Temperature coefficient |
|---|---|---|---|---|---|---|---|---|---|
| | BaO | ZnO | MgO | NiO | ZrO | $Ta_2O_5$ | ($\epsilon r$) | (Qo) | ($\tau f$) |
| Example | | | | | | | | | |
| 1 | 62.5 | 5.1 | 5.1 | 5.1 | 2.6 | 19.6 | 28.3 | 14500 | 3.1 |
| 2 | 62.5 | 5.2 | 5.2 | 5.2 | 1.0 | 20.9 | 27.1 | 13900 | −2.0 |
| 3 | 63.2 | 8.4 | 1.0 | 1.0 | 5.3 | 21.1 | 28.0 | 14000 | 9.0 |
| 4 | 64.9 | 1.1 | 8.6 | 1.1 | 2.7 | 21.6 | 26.6 | 11200 | 3.3 |
| 5 | 65.6 | 1.1 | 1.1 | 1.1 | 9.3 | 21.8 | 29.0 | 11100 | 7.9 |
| 6 | 64.5 | 3.2 | 3.2 | 3.2 | 2.1 | 23.8 | 27.2 | 15000 | 4.7 |
| 7 | 59.6 | 8.1 | 8.1 | 3.0 | 1.0 | 20.2 | 27.3 | 17800 | 0.5 |
| 8 | 61.2 | 6.1 | 6.1 | 4.1 | 2.0 | 20.5 | 27.6 | 20000 | 3.6 |
| 9 | 62.5 | 4.2 | 2.1 | 8.3 | 2.1 | 20.8 | 28.1 | 11500 | 1.4 |
| Comparative Experiment | | | | | | | | | |
| 1 | 60.9 | 0 | 8.4 | 4.8 | 5.3 | 20.6 | 23.6 | 9900 | 8.0 |
| 2 | 62.5 | 8.9 | 5.2 | 2.6 | 0 | 20.8 | 23.9 | 11800 | 0.5 |
| 3 | 60.2 | 2.1 | 2.1 | 12.1 | 3.0 | 20.5 | 28.5 | 9000 | 4.4 |
| 4 | 62.3 | 4.7 | 0 | 2.2 | 10.6 | 20.2 | 32.5 | 7600 | 25.1 |
| 5 | 59.2 | 10.5 | 2.2 | 0 | 5.3 | 22.8 | 28.8 | 7500 | 17.7 |
| 6 | 58.0 | 5.1 | 5.1 | 5.1 | 2.7 | 24.0 | 27.0 | 9300 | 3.0 |
| 7 | 59.5 | 4.2 | 2.1 | 7.6 | 2.1 | 24.5 | 29.0 | 8700 | 8.2 |
| 8 | 66.6 | 1.1 | 1.1 | 1.1 | 8.0 | 22.1 | 25.1 | 9000 | 9.1 |
| 9 | 64.4 | 5.2 | 5.2 | 5.2 | 1.6 | 18.4 | 26.1 | 8400 | −0.2 |
| 10 | 60.9 | 1.1 | 11.1 | 1.1 | 3.8 | 21.9 | 23.2 | 16900 | 2.0 |

This invention brings about a truly conspicuous effect of permitting production of a heretofore unattainable dielectric ceramic composition excelling in dielectric constant and unloaded Q and in stability of temperature properties because it contains Ba, Zn, Mg, Ni, Zr, and Ta in specific proportions.

What is claimed is:

1. A dielectric ceramic composition which contains BaO, ZnO, MgO, NiO, $ZrO_2$ and $Ta_2O_5$ and consists essentially of 59.0 to 66.0 mol % BaO, 1.1–8.4 mol % of ZnO, 1.0–8.6 mol % MgO, 1.0–8.3 mol % NiO, 1.0–9.3 mol % $ZrO_2$ and between 19.0 and less than 24 mol % $Ta_2O_5$.

2. A dielectric ceramic composition according to claim 1, including at least 1.1 mol % ZnO and 1.1 mol % MgO.

3. A composition according to claim 1, wherein said component oxides each possess a purity of approximately 99.9% by weight.

4. A method of forming a dielectric ceramic article that contains BaO, ZnO, MgO, NiO, $ZrO_2$ and $Ta_2O_5$ and consists essentially of 59.0 to 66.0 mol % BaO, 1.1–8.4 mol % of ZnO, 1.0–8.6 mol % MgO, 1.0–8.3 mol % NiO, 1.0–9.3 mol % $ZrO_2$ and between 19.0 and less than 24 mol % $Ta_2O_5$, which method includes the steps of mixing raw materials for said oxides with pure water, drying and calcining the resultant mixture, pulverizing the product of calcination into particles 40 to 100 mesh in diameter, and molding the resultant powder in a shape under pressure in the range of 1 to 2 t/cm² and firing the molded mass.

5. A method according to claim 4, wherein said mixing is carried out with the aid of resin-coated balls.

6. A method according to claim 4, wherein said drying is carried out at a temperature in the range of 100° to 150° C. for a period in the range of one to three hours and said calcination at a temperature in the range of 1,000° to 1,300° C. for a period in the range of one to five hours.

7. A method according to claim 4, wherein said pressure molding is carried out with a hydrostatic press.

8. A method according to claim 4, wherein said firing is carried out at a temperature in the range of 1,450° to 1,650° C. for a period in the range of two to ten hours.

* * * * *